(12) United States Patent
Jun et al.

(10) Patent No.: US 11,227,447 B2
(45) Date of Patent: Jan. 18, 2022

(54) PHYSICAL CONTROLS FOR MIXING VIEWS

(71) Applicant: Hewlett-Packard Development Company, L.P., Spring, TX (US)

(72) Inventors: Ji Won Jun, Palo Alto, CA (US); Hiroshi Horii, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/046,003

(22) PCT Filed: Jul. 16, 2018

(86) PCT No.: PCT/US2018/042263
§ 371 (c)(1),
(2) Date: Oct. 8, 2020

(87) PCT Pub. No.: WO2020/018064
PCT Pub. Date: Jan. 23, 2020

(65) Prior Publication Data
US 2021/0150817 A1 May 20, 2021

(51) Int. Cl.
*G06T 19/00* (2011.01)
*G02B 27/01* (2006.01)
*G06F 3/02* (2006.01)
*G06F 3/0484* (2013.01)

(52) U.S. Cl.
CPC .......... *G06T 19/006* (2013.01); *G02B 27/017* (2013.01); *G02B 27/0179* (2013.01); *G06F 3/02* (2013.01); *G06F 3/04847* (2013.01); *G02B 2027/0185* (2013.01)

(58) Field of Classification Search
None
See application file for complete search history.

(56) References Cited

U.S. PATENT DOCUMENTS

| 9,256,283 | B2 | 2/2016 | Kang |
| 9,607,440 | B1 | 3/2017 | The et al. |
| 9,905,052 | B2 | 2/2018 | Lindeman |
| 2010/0182340 | A1 | 7/2010 | Bachelder et al. |
| 2011/0169946 | A1* | 7/2011 | Rudin ...................... H04N 7/18 348/135 |

(Continued)

FOREIGN PATENT DOCUMENTS

| EP | 2652543 | 9/2014 |
| EP | 3005029 | 4/2016 |

OTHER PUBLICATIONS

Fuchs, H. et al. "Displays for Augmented Reality: Historical Remarks and Future Prospects" Mixed Reality Merging Real and Virtual Worlds, Ohta Y and Tamura H, Ohmsha Ltd, 1999.

*Primary Examiner* — Frank S Chen
(74) *Attorney, Agent, or Firm* — Tong Rea Bentley & Kim LLC

(57) ABSTRACT

In example implementations, an apparatus is provided. The apparatus includes a first channel, a second channel, a physical control interface, and a processor in communication with the physical control interface. The first channel provides a virtual image. The second channel provides a second image. The physical control interface receives the first channel and the second channel. The processor mixes a view of the virtual image and the second image based on a setting of the physical control interface.

11 Claims, 5 Drawing Sheets

(56) References Cited

U.S. PATENT DOCUMENTS

| | | | | |
|---|---|---|---|---|
| 2012/0235902 A1* | 9/2012 | Eisenhardt | .............. | G06F 3/012 |
| | | | | 345/156 |
| 2012/0262484 A1* | 10/2012 | Gottfeld | ................ | G09B 5/065 |
| | | | | 345/632 |
| 2014/0229873 A1* | 8/2014 | Tremblay | .............. | G06F 3/0346 |
| | | | | 715/771 |
| 2017/0358141 A1* | 12/2017 | Stafford | ................ | A63F 13/537 |
| 2018/0218538 A1* | 8/2018 | Short | .................... | G02B 27/017 |
| 2019/0369752 A1* | 12/2019 | Ikeda | .................... | G02B 27/017 |
| 2020/0085511 A1* | 3/2020 | Oezbek | ................. | A61B 34/10 |

\* cited by examiner

PHYSICAL CONTROLS FOR MIXING VIEWS

BACKGROUND

Virtual reality (VR) and augmented reality (AR) are being used for a variety of different applications. For example, VR and AR can be used for entertainment, video games, educational purposes, training, and the like. VR can provide an artificially created environment that is displayed in a VR headset. The user may interact with the artificially created environment. AR can provide some artificially created environments on top of the real environment that a user sees through the AR headset.

DETAILED DESCRIPTION

Examples described herein provide an apparatus that includes physical controls to mix views in a virtual reality (VR) headset or an augmented reality (AR) headset. As noted above, VR and AR can be used for a variety of different applications. However, typically VR and AR views are "all or nothing". In other words, when the user has the VR display on, the user is completely immersed in the artificial environment in the VR display. The user is unable to view anything in the real world.

However, in some instances the ability to mix the VR view with a reality view or a view of another image may provide a better user experience. For example, a room may be designed with a VR system. However, the room may be aligned with an actual view of the room. Thus, a user may see the room in the VR view mixed with the view of the actual room to see how the new design looks, to ensure the room was detailed accurately in the VR system, and the like.

Examples herein provide physical controls for VR/AR headsets to allow different views (e.g., the VR or AR view with a real view or secondary image) to be mixed. The physical controls may allow either view to be gradually increased or decreased. In other words, the physical control may provide control over the opacity of either view from 0 to 100 percent. The physical control may be located directly on the VR/AR headset or may be externally located from the VR/AR headset. The physical control may be a physical knob, slider, lever, or any other mechanical feature, that provides control of the opacity of either view to mix the different views.

Figure 1:
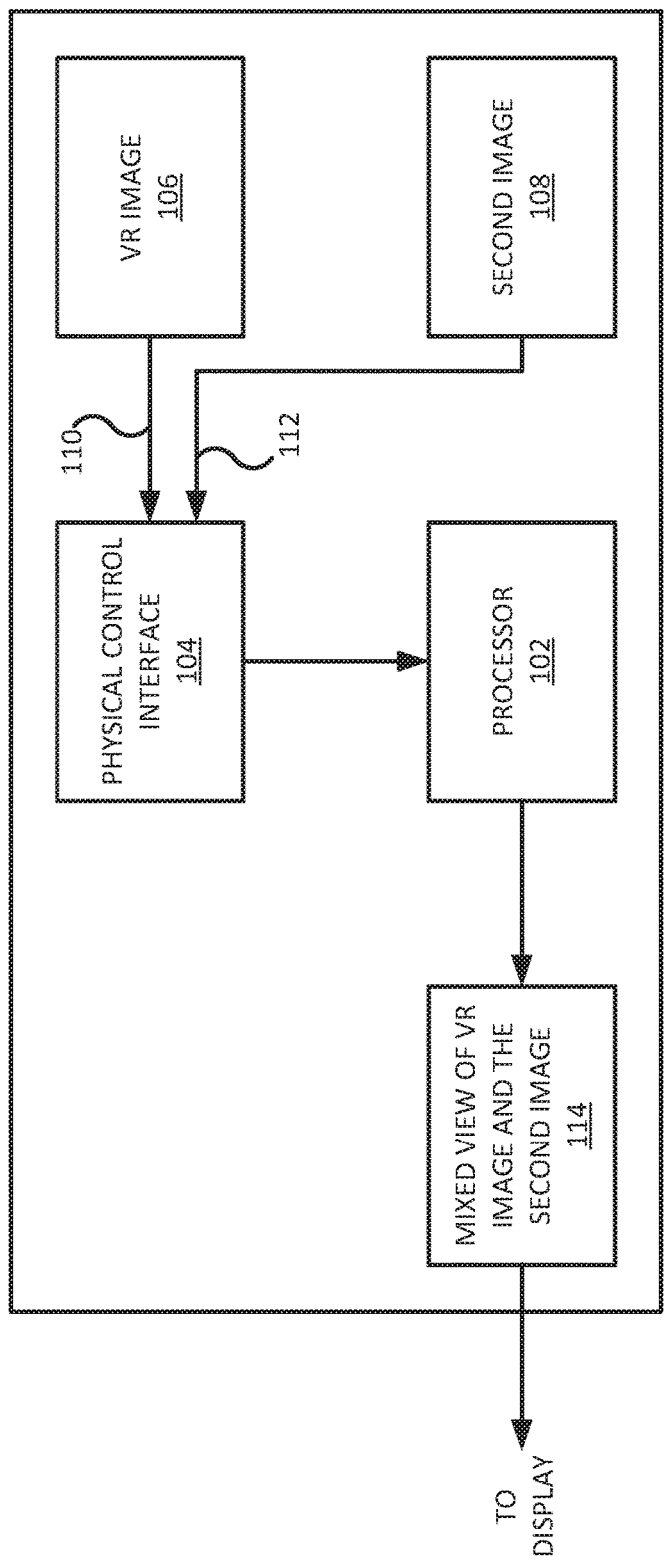
FIG. 1 is a block diagram of an example apparatus of a virtual reality system with a physical control to mix views of the present disclosure.

FIG. 1 illustrates a block diagram of an apparatus 100 of the present disclosure. The apparatus 100 may be a virtual reality (VR) or augmented reality (AR) system with a head mounted display (HMD), an HMD with an integrated VR system, and the like.

In one example, the apparatus 100 may include a processor 102 and a physical control interface 104. The processor 102 may be communicatively coupled to be the physical control interface 104. In one example, the physical control interface 104 may receive a virtual (VR) image 106 via a first channel 110 and a second image 108 via a second channel 112.

In one example, the virtual image 106 may be a computer generated image, such as a virtual reality image, an augmented reality image, and the like. The computer generated image may be an artificial environment that comprises a still image, a video, and the like. The virtual image 106 may be generated by the processor 102 of the apparatus 100 or may be received from an external system (e.g. an external computing device, image source, and the like). The virtual image 106 may also include audio.

In one example, the second image 108 may be a real image. For example, the second image 108 may be a live video stream captured from a camera. In another example, the second image 108 may be photograph, a stored video, and the like. In one example, the second image 108 may also include audio.

In one example, the physical control interface 104 may be a mechanical switch, knob, lever, or dial that is communicatively coupled to the apparatus 100. For example, the mechanical switch or dial may be directly connected to the apparatus 100. In another example, the physical control interface 104 may be external to the apparatus 100 (e.g., a mixing board), but communicatively coupled to the processor 102.

In one example, the physical control interface 104 may allow a user to set an opacity level of the virtual image 106 and/or the second image 108. As noted above, the physical control interface 104 may be a mechanical slider switch, a rotating dial or knob, a lever, and the like. In one example, the physical control interface 104 may include separate mechanical switches or rotating dials for the first channel 110 and the second channel 112. Thus, the opacity level of the virtual image 106 and the second image 108 may be independently controlled.

In another example, a single mechanical slider switch or rotating dial may change the opacity level of the virtual image 106 and the second image 108. For example, one end of the switch or dial can set the opacity level of the virtual image 106 to 100% and the second image 108 to 0% and the other end of the switch or dial can set the opacity level of the virtual image 106 to 0% and the second image 108 to 100%. Setting the switch or the dial to a middle setting can change the opacity level of the virtual image 106 to 50% and the second image 108 to 50%.

In one example, the physical control interface 104 may move freely from between any increment between a minimum and a maximum (e.g., 0 percent to 100 percent). In other words, the physical control interface 104 may allow for any gradation of opacity level (e.g., 1%, 2%, 34%, 34.5%, 40.1%, and the like). For example, a knob may rotate freely or a slider switch may slide freely up and down between a minimum value and a maximum value.

In one example, the physical control interface 104 may move between predefined increments of opacity levels. For example, a switch may move in 10 percent increments between 0 percent and 100 percent. Each increment may have a tactile feedback to let the user know the switch is engaged at the desired increment. For example, the switch may "click" at each increment.

The processor 102 may receive the virtual image 106, the second image 108, and the settings of the physical control interface 104. Based on the settings of the physical control interface 104 (e.g., the opacity levels of the virtual image 106 and the second image 108), the processor 102 may generate a mixed view 114 of the virtual image 106 and the second image 108. The mixed view 114 may then be transmitted to a display of the apparatus 100 and shown on the display.

In one example, the mixed view 114 may be a combination of the virtual image 106 and the second image 108. The opacity level of the virtual image 106 or the second image 108 may be adjusted based on the setting of the physical control interface 104. After the opacity level of the virtual image 106 or the second image 108 is adjusted, the virtual image 106 and the second image 108 may be combined to form the mixed view 114. In one example, the mixed view 114 may be a composite image of the virtual image 106 and the second image 108 with the adjusted opacity level.

In one example, the virtual image 106 and the second image 108 may be of a same location. Thus, the virtual image 106 and the second image 108 may include an anchor point or reference point that is aligned on both the virtual image 106 and the second image 108 to allow the virtual image 106 and the second image 108 to be aligned when the mixed view 114 is created.

In another example, the virtual image 106 and the second image 108 may be different objects, locations, scenes, and the like. The processor 102 may determine the optimal alignment of the virtual image 106 and the second image 108. For example, the virtual image 106 may be an automobile and the second image 108 may be an image of a scene or environment. The processor 102 may detect the "ground" or a street in the second image 108 and position the virtual image 106 on the ground or the street in the second image 108 to form the mixed view 114.

In one example, the mixed view 114 may also include a mixed audio file. As noted above, the virtual image 106 and the second image 108 may also include audio files. For example, the virtual image 106 may have some background music and the second image 108 may include some background sounds, voices, music, and the like. The mixed view 114 may also mix the audio at a similar percentage associated with the desired opacity level of the images. For example, if the physical control interface 104 is used to set the opacity level of the virtual image 106 to 40%, then a volume level of the audio associated with virtual image 106 may also be set to 40%.

Figure 2:
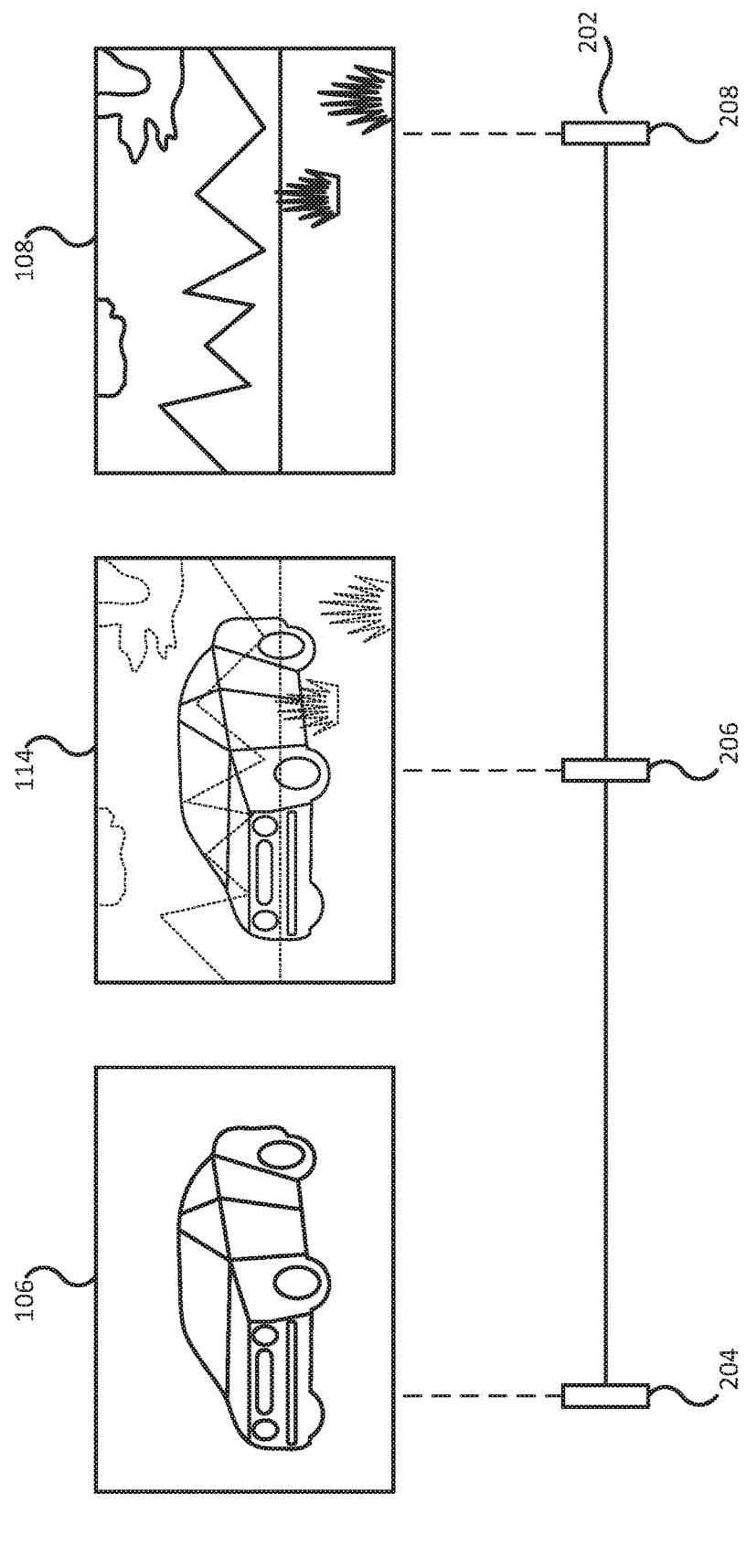
FIG. 2 is a block diagram of an example mixed view of the present disclosure.

FIG. 2 illustrates an example of the mixed view 114 of the virtual image 106 and the second image 108 of the present disclosure. In one example, the bar 202 may represent the different opacity level settings of the physical control interface 104. When the bar 202 is at a first setting 204, the opacity level of the second image 108 may be 100% and the opacity level of the virtual image 106 may be 0%. In other words, only the virtual image 106 can be seen. When the bar 202 is at a second setting 208, the opacity level of the second image 108 may be 0% and the opacity level of the virtual image 106 may be 100%. In other words, only the second image 108 can be seen.

When the bar 202 is in a middle setting 206, the opacity levels of the virtual image 106 and the second image 108 may both be 50%. Thus, both the virtual image 106 and the second image 108 can be seen in the mixed view 114. The bar 202 may be set to any level in between the settings 204 and 208 to change the opacity level of the virtual image 106 and the second image 108 to adjust the visibility of the virtual image 106 or the second image 108 in the mixed view 114.

Although the opacity levels are provided in the examples in percentages, it should be noted that the opacity levels may be set via any increment. For example, the physical control interface 104 may provide levels from 0 to 10.

Thus, the physical control interface 104 may allow a user to control the mixed view 114 that is generated between the virtual image 106 and the second image 108. The mixed view 114 may improve the productivity of a user for a variety of different applications. For example, when a user is designing an automobile in the virtual image 106, the user may be able to see how the automobile may look in a live video environment captured in the second image 108. The user may adjust the opacity level of the second image 108 to make design changes of the automobile in the virtual image 106. Then the user may re-adjust the opacity level via the physical control interface 104 to see how the changes look in the live video environment of the second image 108.

In another example, the virtual image 106 may be an interior design of a room. The second image 108 may be a live view of the room. The virtual image 106 may be mixed with the second image 108 to see what the interior design may look like in the actual room and detect any architectural discrepancies between the virtual image 106 and the second image 108. If discrepancies are found, the opacity level of the second image 108 may be adjusted to make the changes on the virtual image 106. Then, the opacity level of the second image 108 may be re-adjusted via the physical control interface 104 to see how the changes in the virtual image 106 look mixed with the actual room in the second image 108.

Figure 3:
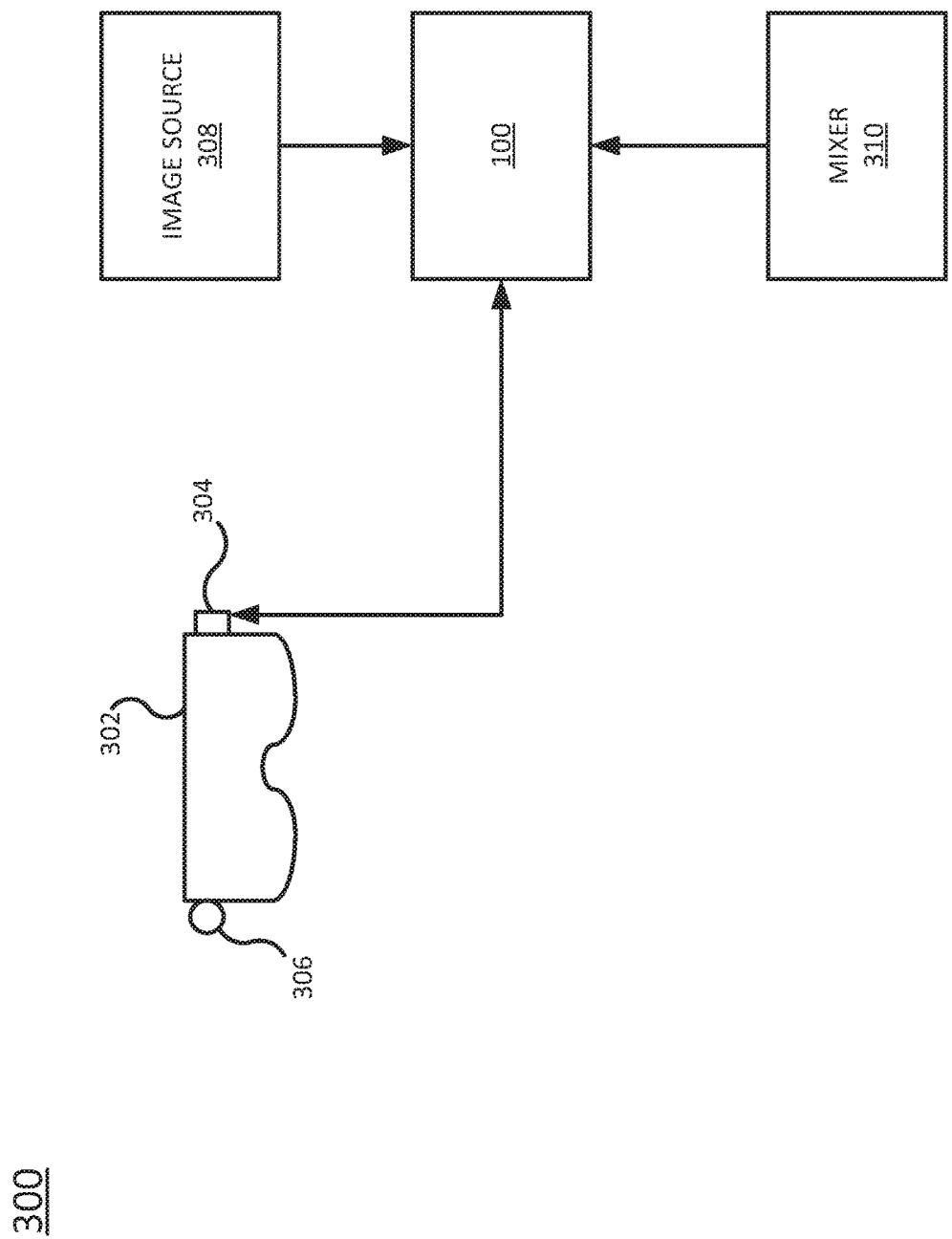
FIG. 3 is a block diagram of an example system that includes the apparatus with a physical control to mix views of the present disclosure.

FIG. 3 illustrates a block diagram of an example system 300 that includes the apparatus 100. In one example, the apparatus 100 may be communicatively coupled to a head mounted display (HMD) 302, an image source 308, and a mixer 310. In one example, the HMD 302 may include a display that can display video images, e.g., the mixed view 114 generated by the apparatus 100. In some examples, the HMD 302 may be integrated with the apparatus 100. In other examples, the HMD 302 may be an external device communicatively coupled to the apparatus 100.

In one example, when the HMD 302 is integrated as part of the apparatus 100, the HMD 302 may include a mechanical interface 304 (e.g., a slider, a lever, a dial, a knob, and the like) that may be the physical control interface 104. In another example, the physical control interface 104 may be externally coupled to the apparatus 100 via the mixer 310.

In one example, the HMD 302 may include a camera 306. The camera 306 may be a standard red, green, blue (RGB) video camera that can capture live video. For example, as a user wears the HMD 302 and looks around, the camera 306 may capture the view that the user sees through the HMD 302. The camera 306 may also capture still photographs. The live video or photographs captured by the camera 306 may provide the second image 108.

In another example, the second image 108 may be stored in an external computing system or database such as the image source 308. The image source 308 may be an external computing device (e.g., a remotely located computer, an external computing system, an external video generator, and the like) or an external computer readable storage medium that stores captured videos, photographs, images, computer generated images, and the like (e.g., an external database, an external storage network, and the like). The second image 108 may be selected from the image source 308.

In one example, the virtual image 106 may be generated by the processor 102 of the apparatus 100, as described above. In another example, the virtual image 106 may be also stored and selected from the image source 308. Thus, the apparatus 100 may mix the virtual image 106 and the second image 108 using either the mechanical interface 304 or the mixer 310. The mixed view 114 that is generated may then be shown in the display of the HMD 302.

In one example, the opacity level may be automatically selected by the apparatus 300. For example, the HMD 302 may include an inward facing camera that can track the eyes of a user wearing the HMD 302. The camera may track the focus of the user's eye to determine which objects the user may be focusing on. The apparatus 300 may then automatically adjust the opacity of the virtual image 106 and the second image 108 to allow the user to more easily see the object or objects in the virtual image 106 or the second image 108 that the user is focusing on.

In one example, the apparatus 300 may segment portions of the virtual image 106 and/or the second image 108 and automatically adjust the opacity levels of those segments. For example, if the user is focusing on a particular object in the virtual image 106, the apparatus 300 may segment the object in the virtual image 106 and automatically increase the opacity level of the segment that includes the object. As a result, the user may more easily see or view the object in the virtual image 106 that is combined with the second image 108.

Figure 4:
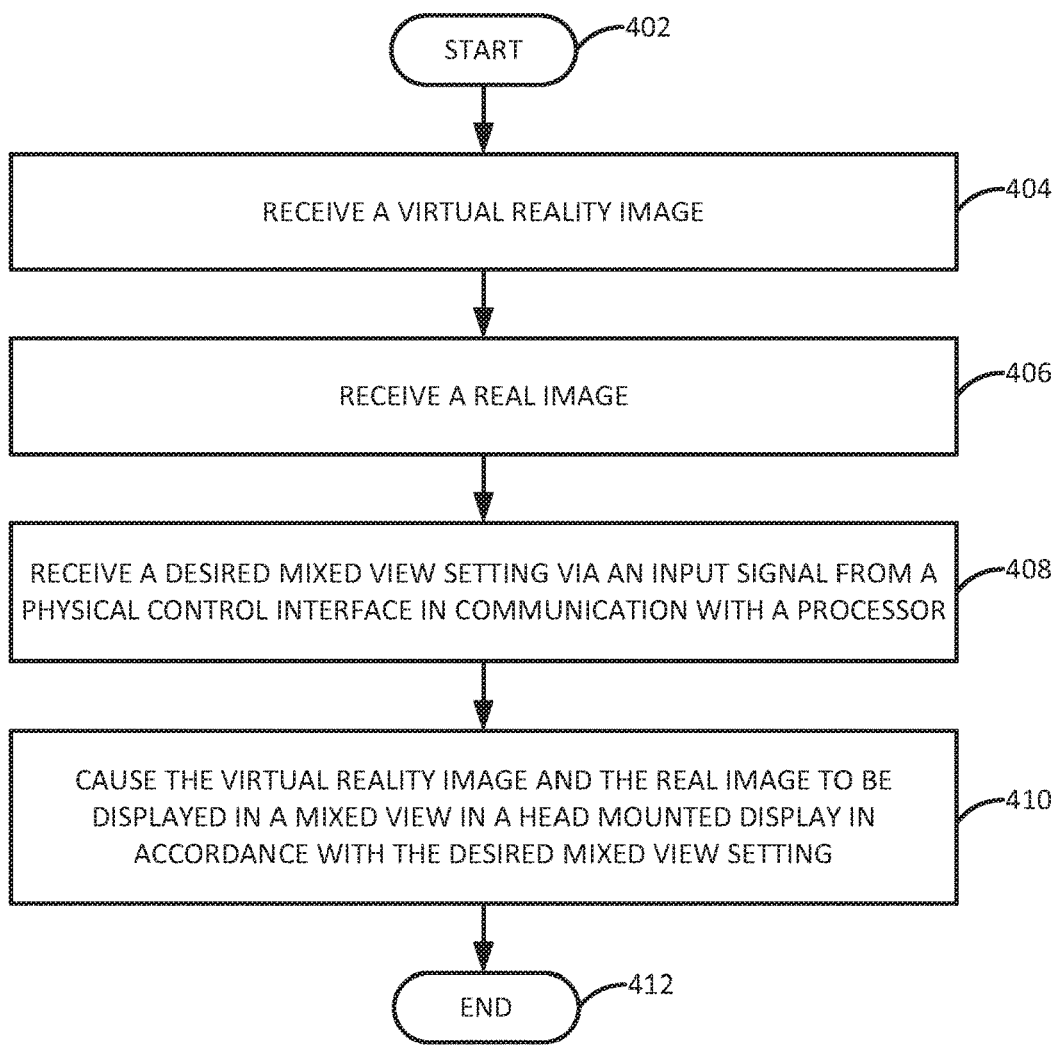
FIG. 4 is a flow chart of an example method for mixing views in a head mounted display of a virtual reality system.

FIG. 4 illustrates a flow diagram of an example method 400 for mixing views in a head mounted display of a virtual reality system. In an example, the method 400 may be performed by the apparatus 100 or the apparatus 500 illustrated in FIG. 5 and described below.

At block 402, the method 400 begins. At block 404, the method 400 receives a virtual reality (VR) image. For example, the VR image may be an artificially created image. The VR image may provide a 360 degree view of an object. Although the method 400 refers to a VR image, it should be noted that any virtual image, including an augmented reality image can be used.

At block 406, the method 400 receives a real image. In one example, the real image may be a live video or a photograph. In other words, the real image may depict a view of an actual location, view, environment, background, and the like.

At block 408, the method 400 receives a desired mixed view setting via an input signal from a physical control interface in communication with the processor. The physical control interface may be directly coupled to a VR system or a HMD having an integrated VR system. In one example, the physical control interface may be externally located from the VR system and communicatively coupled to the VR system or the HMD.

The physical control interface may allow a user to adjust the desired mixed view setting. The desired mixed view setting may set opacity levels of the VR image and the real image. When, the user adjusts the desired mixed view setting via the physical control interface, the physical control interface may generate an input signal that indicates the desired mixed view setting.

In one example, a single desired mixed view setting may adjust the opacity level of the VR image relative to the real image. For example, if the opacity level of the VR image is set to 34% then the opacity level of the real image may be set to 66%, and vice versa.

In one example, the desired mixed view setting may provide two independent settings for the VR image and the real image independent of one another. In other words, the opacity level of the VR image may be set independent of the opacity level of the real image.

At block 410, the method 400 causes the virtual reality image and the real image to be displayed in a mixed view in a head mounted display in accordance with the desired mixed view setting. In one example, mixed view may be a new image that is generated based on a mixture of the VR image and the real image based on the desired mixed view setting.

In another example, the mixed view may be a simultaneously display of the VR image and the real image via separate channels. However, the opacity levels of the VR image and the real image may be adjusted in real-time based on the desired mixed view setting. In other words, the amount of visibility of the VR image or the real image in the mixed view may be seen as the user adjusts the physical control interface.

The physical control interface may allow the user to change the opacity levels of the VR image or the real image at any time. For example, the user may provide a new desired mixed view setting by moving the physical control interface. The new desired mixed view setting may be received in response to the movement of the physical control interface as the user is viewing the mixed view of the VR image and the real image.

The new desired mixed view setting may cause the mix view of the VR image and the real image to be changed in accordance with the new desired mixed view setting. At block 412, the method 400 ends.

Figure 5:
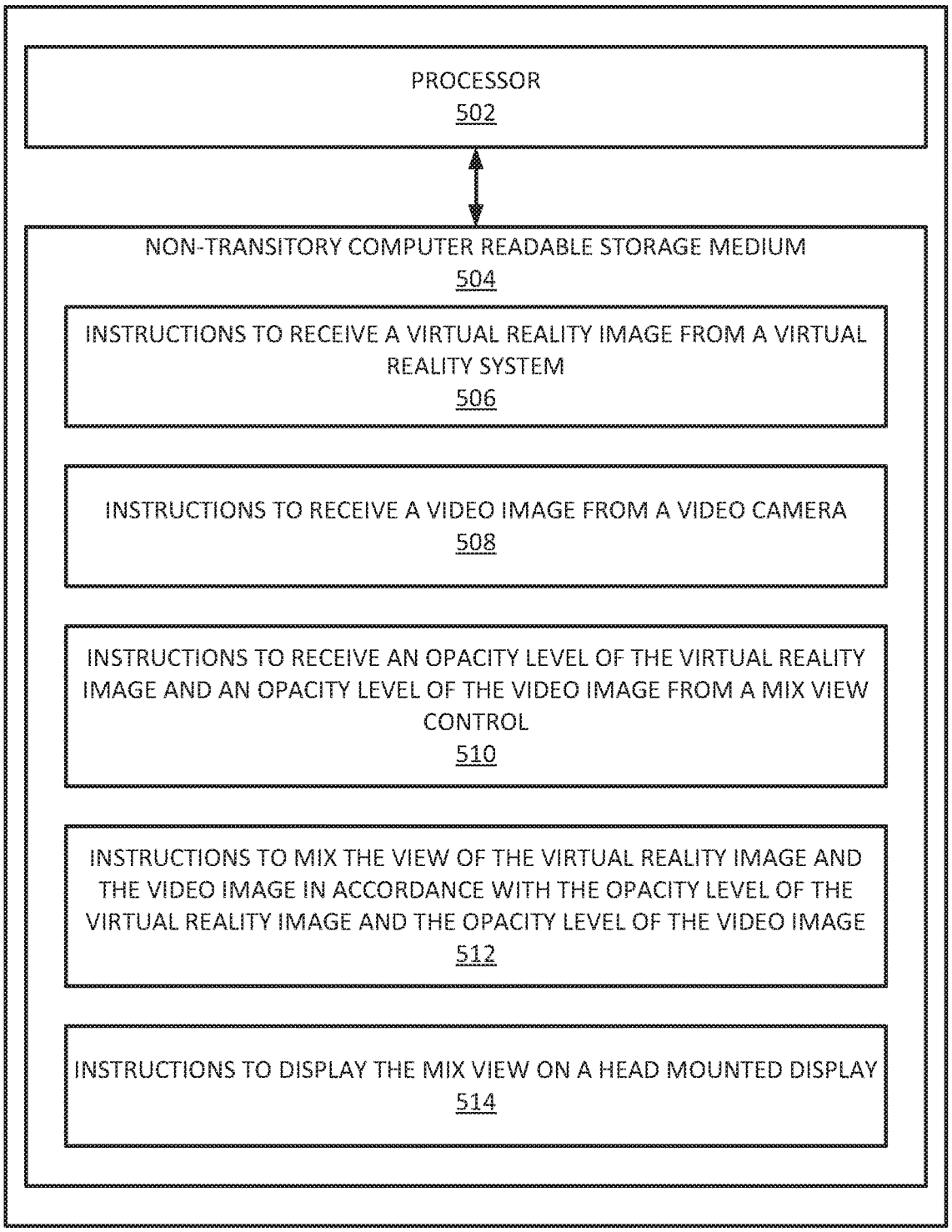
FIG. 5 is a block diagram of an example non-transitory computer readable storage medium storing instructions executed by a processor to mix views in a head mounted display of a virtual reality system.

FIG. 5 illustrates an example of an apparatus 500. In one example, the apparatus 500 may be the apparatus 100. In one example, the apparatus 100 may include a processor 502 and a non-transitory computer readable storage medium 504. The non-transitory computer readable storage medium 504 may include instructions 506, 508, 510, 512, and 514 that, when executed by the processor 502, cause the processor 502 to perform various functions to mix views in a head mounted display of a virtual reality system.

In one example, the instructions 506 may include instructions to receive a virtual reality image from a virtual reality system. The instructions 508 may include instructions to receive a video image from a video camera. The video camera may be coupled to a HMD of a VR system. The video image may capture a view of a real environment as seen from the perspective of a user wearing the HMD.

The instructions 510 may include instructions to receive an opacity level of the virtual reality image and an opacity level of the video image from a mix view control. The mix view control may be a physical or mechanical control that is coupled to the VR system or the HMD. In one example, the mix view control may be external to the VR system or the HMD and communicatively coupled to the VR system or the HMD. The mix view control may allow a user to control an opacity level of the VR image to any amount between 0 percent to 100 percent and the opacity level of the video image from any level between 0 percent to 100 percent. The mix view control may allow the user to control the opacity level of the VR image and the video image as the user is viewing the mix view of the VR image and the video image.

The instructions 512 may include instructions to mix the view of the virtual reality image and the video image in accordance with the opacity level of the virtual reality image and the opacity level of the video image. The instructions 514 may include instructions to display the mix view on a head mounted display.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

The invention claimed is:

1. An apparatus, comprising:
   a first channel to display a virtual image;
   a second channel to display a live video stream;
   a first physical control interface to receive the first channel and to control an opacity of the virtual image;
   a second physical control interface to receive the second channel and to control an opacity of the live video stream, wherein the first physical control interface and the second physical control interface are located on a head mounted display of a virtual reality system, wherein the first physical control interface and the second physical control interface each comprise a lever, a knob, or a slider to adjust the opacity of the virtual image or the opacity of the live video stream; and
   a processor in communication with the first physical control interface and the second physical control interface, wherein the processor is to mix a view of the virtual image and the live video stream based on a setting of the first physical control interface and the second physical control interface, wherein the virtual image and the live video stream are aligned based on objects in the live video stream.

2. The apparatus of claim 1, wherein the setting of the first physical control interface and the second physical control interface adjusts the opacity of the virtual image between 0 percent to 100 percent.

3. The apparatus of claim 1, wherein the setting of the first physical control interface and the second physical control interface adjusts the opacity of the second image between 0 percent to 100 percent.

4. The apparatus of claim 1, further comprising:
   a video camera in communication with the second channel to capture the live video stream.

5. The apparatus of claim 1, wherein the virtual image and the live video stream each include an image of a same location, and the object comprises an anchor point to align the virtual image and the live video stream.

6. The apparatus of claim 1, wherein the virtual image includes a first audio file and the live video stream includes a second audio file, wherein the opacity of the virtual image and the opacity of the live video stream is to set a volume level of the first audio file and a volume level of the second audio file in a mixed view of the virtual image and the live video stream.

7. A method, comprising:
   receiving, by a processor, a virtual reality image;
   receiving, by the processor, a real image;
   receiving, by the processor, a desired mixed view setting via a first input signal from a first physical control interface and a second input signal from a second physical control interface in communication with the processor, wherein the first input signal and the second input signal are each associated with an opacity level set by a position of the first input signal and the second input signal; and
   causing, by the processor, the virtual reality image and the real image to be displayed in a mixed view in a head mounted display in accordance with the desired mixed view setting, wherein the virtual image and the real image are aligned based on objects in the second image.

8. The method of claim 7, further comprising:
   receiving, by the processor, a new desired mixed view setting based on a movement of the first physical control interface or the second physical control interface; and
   causing, by the processor, the mix view of the virtual reality image and the real image to be changed in accordance with the new desired mixed view setting.

9. The method of claim 7, wherein the virtual reality image and the real image are received from an external computing device.

10. A non-transitory machine-readable storage medium encoded with instructions executable by a processor, the machine-readable storage medium comprising:
    instructions to receive a virtual reality image from a virtual reality system;
    instructions to receive a video image from a video camera;
    instructions to receive an opacity level of the virtual reality image via a first physical control interface;
    instructions to receive an opacity level of the video image from a second physical control interface, wherein the first physical control interface and the second physical control interface are located on a head mounted display of a virtual reality system, wherein the first physical control interface and the second physical control interface each comprise a lever, a knob, or a slider to adjust the opacity of the virtual image or the opacity of the video image;
    instructions to mix the view of the virtual reality image and the video image in accordance with the opacity level of the virtual reality image and the opacity level of the video image, wherein the virtual image and the live video stream are aligned based on objects in the video image; and
    instructions to display the mix view on the head mounted display.

11. The non-transitory machine-readable storage medium of claim 10, wherein mix view control adjusts from zero percent opacity of the virtual reality image to 100 percent opacity of the virtual reality image and 100 percent opacity of the video image and 0 percent opacity of the video image.

* * * * *